(12) United States Patent
Tanner

(10) Patent No.: US 7,213,690 B2
(45) Date of Patent: *May 8, 2007

(54) SELF-POWERING SHOCK, VIBRATION AND ACOUSTIC ISOLATION SYSTEM

(75) Inventor: Edward T. Tanner, Williamsburg, VA (US)

(73) Assignee: Newport News Shipbuilding, Newport News, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/662,731

(22) Filed: Sep. 15, 2003

(65) Prior Publication Data

US 2004/0226788 A1 Nov. 18, 2004

Related U.S. Application Data

(63) Continuation-in-part of application No. 09/963,566, filed on Sep. 27, 2001, now Pat. No. 6,752,250.

(51) Int. Cl.
*F16F 9/48* (2006.01)
(52) U.S. Cl. ............... 188/287; 267/64.28; 267/140.14
(58) Field of Classification Search ................ 188/267, 188/267.1, 267.2; 267/64.11–64.28, 136, 267/131, 140.14, 140.15
See application file for complete search history.

(56) References Cited

U.S. PATENT DOCUMENTS

| 3,559,027 | A | * | 1/1971 | Arsen ............................. 322/3 |
| 3,737,155 | A |   | 6/1973 | Karlan |
| 3,807,678 | A |   | 4/1974 | Karnopp et al. |
| 4,080,636 | A | * | 3/1978 | Ravizza .................... 360/77.16 |
| 4,326,155 | A | * | 4/1982 | Griebeler ..................... 318/576 |
| 4,468,739 | A |   | 8/1984 | Woods et al. |

(Continued)

OTHER PUBLICATIONS

Delphi—Damping Systems—MagneRide™ (Description of Product); Dec. 2002; Delphi Energy & Chassis Systems, Troy MI.

*Primary Examiner*—Pam Rodriguez
(74) *Attorney, Agent, or Firm*—Hunton & Williams LLP

(57) ABSTRACT

A shock and vibration isolation system for mounting equipment to a base wall uses a semi-active damper in parallel with a spring arrangement to provide optimum isolation with respect to both shock and vibration. The system comprises a load plate configured for attachment of the equipment thereto and a base plate configured for attachment to the base wall. The base plate is substantially parallel to the load plate. The system further comprises a spring arrangement disposed intermediate the load plate and the base plate. The spring arrangement engages the load plate and the base plate to bias the load plate and the base plate in a separated relationship. A semi-active damper is also disposed intermediate the load plate and the base plate. The a semi-active damper is adapted for providing a selectively variable reaction force to the load plate and the base plate responsive to a relative displacement of the load plate with respect to the base plate. A damper controller is operatively connected to the semi-active damper for controlling the reaction force applied to the load plate and the base plate. The damper controller includes a rechargeable power supply. The isolation system also comprises a recharging arrangement in electrical communication with the rechargeable power supply. The recharging arrangement is mounted to one of the base plate and the load plate and is adapted for converting vibratory motion to electrical energy for storage in the rechargeable power supply.

14 Claims, 10 Drawing Sheets

U.S. PATENT DOCUMENTS

| | | |
|---|---|---|
| 4,679,775 A | 7/1987 | Funaki et al. |
| 4,781,363 A | 11/1988 | Braun |
| 4,858,733 A | 8/1989 | Noguchi et al. |
| 4,887,699 A | 12/1989 | Ivers et al. |
| 5,091,679 A | 2/1992 | Murty et al. |
| 5,277,281 A | 1/1994 | Carlson et al. |
| 5,366,048 A | 11/1994 | Watanabe et al. |
| 5,396,973 A | 3/1995 | Schwemmer et al. |
| 5,398,785 A | 3/1995 | Leitmann et al. |
| 5,449,150 A | 9/1995 | Watanabe et al. |
| 5,454,451 A | 10/1995 | Kawamata et al. |
| 5,458,217 A | 10/1995 | Ohishi |
| 5,492,312 A | 2/1996 | Carlson |
| 5,582,385 A | 12/1996 | Boyle et al. |
| 5,652,704 A | 7/1997 | Catanzarite |
| 5,802,966 A | 9/1998 | Schoch |
| 5,848,663 A | 12/1998 | Kuriki |
| 5,876,012 A | 3/1999 | Haga et al. |
| 5,884,736 A | 3/1999 | Burdisso et al. |
| 5,964,455 A | 10/1999 | Catanzarite et al. |
| 6,019,201 A | 2/2000 | Gordaninejad et al. |
| 6,021,991 A | 2/2000 | Mayama et al. |
| 6,082,715 A | 7/2000 | Vandermolen |
| 6,123,312 A | 9/2000 | Dai |
| 6,327,024 B1 | 12/2001 | Hayashi et al. |
| 6,382,369 B1 | 5/2002 | Lisenker |

* cited by examiner

SELF-POWERING SHOCK, VIBRATION AND ACOUSTIC ISOLATION SYSTEM

CROSS-REFERENCE TO RELATED APPLICATIONS

This application is a continuation-in-part of U.S. application Ser. No. 09/963,566, filed Sep. 27, 2001, now U.S. Pat. No. 6,752,250, which is incorporated herein by reference in its entirety. This application is also related to U.S. application Ser. No. 10/850,209, filed May 20, 2004.

BACKGROUND OF THE INVENTION

The present invention relates generally to isolation systems used to support and protect sensitive equipment installed on an aircraft, ship, or submarine and more particularly to an isolation system that protects such equipment against shock and vibration and also minimizes the transmission of acoustic energy from the isolated equipment to the supporting structure.

Traditionally, the U.S. Government and other governments have required that electronic equipment and other sensitive equipment used aboard military vessels, such as aircraft, ships, and submarines, be specifically designed and manufactured so as to withstand these vessels' challenging operational environments. Accordingly, suppliers have been required to specially "ruggedize" or "militarize" equipment in order to satisfy certain testing criteria, such as shock testing and/or vibration testing.

Unfortunately, such militarized equipment has two significant drawbacks. First, specially designing each piece of equipment to withstand challenging operational environments can impose significant costs. Second, because each piece of equipment must be specially designed to meet testing criteria, the deployment of state-of-the-art technologies can be significantly delayed. For instance, an improved flat screen display technology may be readily available for commercial applications, but it may be years before the technology can be incorporated into military equipment.

As a result of these and other drawbacks of so-called "MIL-SPEC" equipment, since the early 1990's the Department of Defense has issued various directives permitting and, in fact, encouraging, utilization of so-called "commercial-off-the-shelf" (COTS) technology. As a result, military vessels have been increasingly using COTS electronic components and systems in lieu of militarized equipment. COTS equipment is cheaper, it offers the latest technology, and in many instances, it offers a larger pool of suppliers from which the Government (or its prime contractors) can select.

One challenge presented by COTS equipment, however, relates to its ability to pass shock and vibration requirements. Militarized equipment has traditionally been rigidly mounted to shipboard structures. However, COTS equipment tends to have limited capabilities to withstand shock and vibration motions, and, therefore, tends to be unsuitable for being rigidly mounted to shipboard structures. Therefore, COTS equipment usually requires isolation devices (shock mounts) to mitigate the effects of shock and vibration presented in the operational environment. For example, COTS equipment is often placed in component racks that are coupled to a vessel structure (e.g., a floor or a wall) via one or more shock absorption mounts. Alternatively, individual pieces of equipment may be coupled directly to the vessel structure via shock absorption mounts. In other instances, COTS equipment may be placed on flat platforms that, in turn, are coupled to the vessel structure using shock absorption mounts.

The design of the shock absorption mounts used to protect COTS equipment runs into the inherent difficulty of designing into a single isolator the ability to perform equally well as a shock isolator and a vibration isolator. This problem arises due to the fact that a good vibration isolator tends to be a poor shock isolator and a good vibration isolator tends to be a poor shock isolator. Most attempts to solve the combined isolation problem with a passive device have met with limited success, particularly in shipboard isolation applications where many inputs are often present simultaneously. The typical approach to solving the shipboard isolation problem involves the use of a combination of separate passive isolators for shock and vibration. This inevitably leads to modifying vibration isolators to survive shock inputs and/or modifying shock isolators to perform adequately as vibration isolators. Other environments present similar design difficulties.

Another problem presented to the designer is that the damping mechanism used in a shock isolation system must provide a force that is matched to the mass of the equipment being isolated. When equipment is changed out or modified, the isolation system must be changed to reflect changes in mass and mass distribution. Given the frequency of equipment change-out and upgrades, this is a significant drawback.

SUMMARY OF THE INVENTION

The present invention provides an ideal solution in the form of a single self-contained isolation system that provides both effective vibration isolation in the 10 to 200 Hz range and shock isolation from a variety of inputs such as underwater explosions, wave slap, impact, etc. The system also provides acoustic isolation of the base structure to which sensitive equipment is mounted.

One aspect of the invention provides a shock and vibration isolation system for mounting equipment to a base wall. The system comprises a load plate configured for attachment of the equipment thereto and a base plate configured for attachment to the base wall. The base plate is substantially parallel to the load plate. The system further comprises a spring arrangement disposed intermediate the load plate and the base plate. The spring arrangement engages the load plate and the base plate to bias the load plate and the base plate in a separated relationship. A semi-active damper is also disposed intermediate the load plate and the base plate. The a semi-active damper is adapted for providing a selectively variable reaction force to the load plate and the base plate responsive to a relative displacement of the load plate with respect to the base plate. A damper controller is operatively connected to the semi-active damper for controlling the reaction force applied to the load plate and the base plate. The damper controller includes a rechargeable power supply. The isolation system also comprises a recharging arrangement in electrical communication with the rechargeable power supply. The recharging arrangement is mounted to one of the base plate and the load plate and is adapted for converting vibratory motion to electrical energy for storage in the rechargeable power supply.

Another aspect of the invention provides a self-powered semi-active damping system comprising a semi-active damper disposable intermediate a load and a base wall. The a semi-active damper is adapted for providing a selectively variable reaction force to the load and the base wall responsive to a relative displacement of the load with respect to the base wall. A damper controller is operatively connected to the semi-active damper for controlling the reaction force applied to the load and the base wall. A rechargeable power supply is operably connected to the damper controller and the semi-active damper. The damping system further comprises a recharging arrangement in electrical communication with the rechargeable power supply. The recharging arrangement is mountable to one of the base wall and the load and is adapted for converting vibratory motion to electrical energy for storage in the rechargeable power supply.

Other objects and advantages of the invention will be apparent to one of ordinary skill in the art upon reviewing the detailed description of the invention.

DETAILED DESCRIPTION OF THE INVENTION

Shipboard systems are subject to multiple vibratory and shock inputs. In such environments, semi-active isolation systems may be more successful than a passive system. A semi-active isolation system can be designed to simultaneously isolate equipment from many combined and varying inputs. The present invention contemplates the combination of a semi-active damper with a passive spring element to provide an isolation system that performs well as both a vibration isolator and a shock isolator.

Combining shock and vibration isolation into a single package is highly beneficial in that the single combined isolation system replaces two separate systems. This can significantly reduce weight and increase available volume, which is particularly important in submarine applications where space is limited. Also, with varying and diverse inputs, a combined semi-active/passive isolation system can be designed to perform better than separate passive shock and vibration isolation systems operating in parallel.

Figure 1:
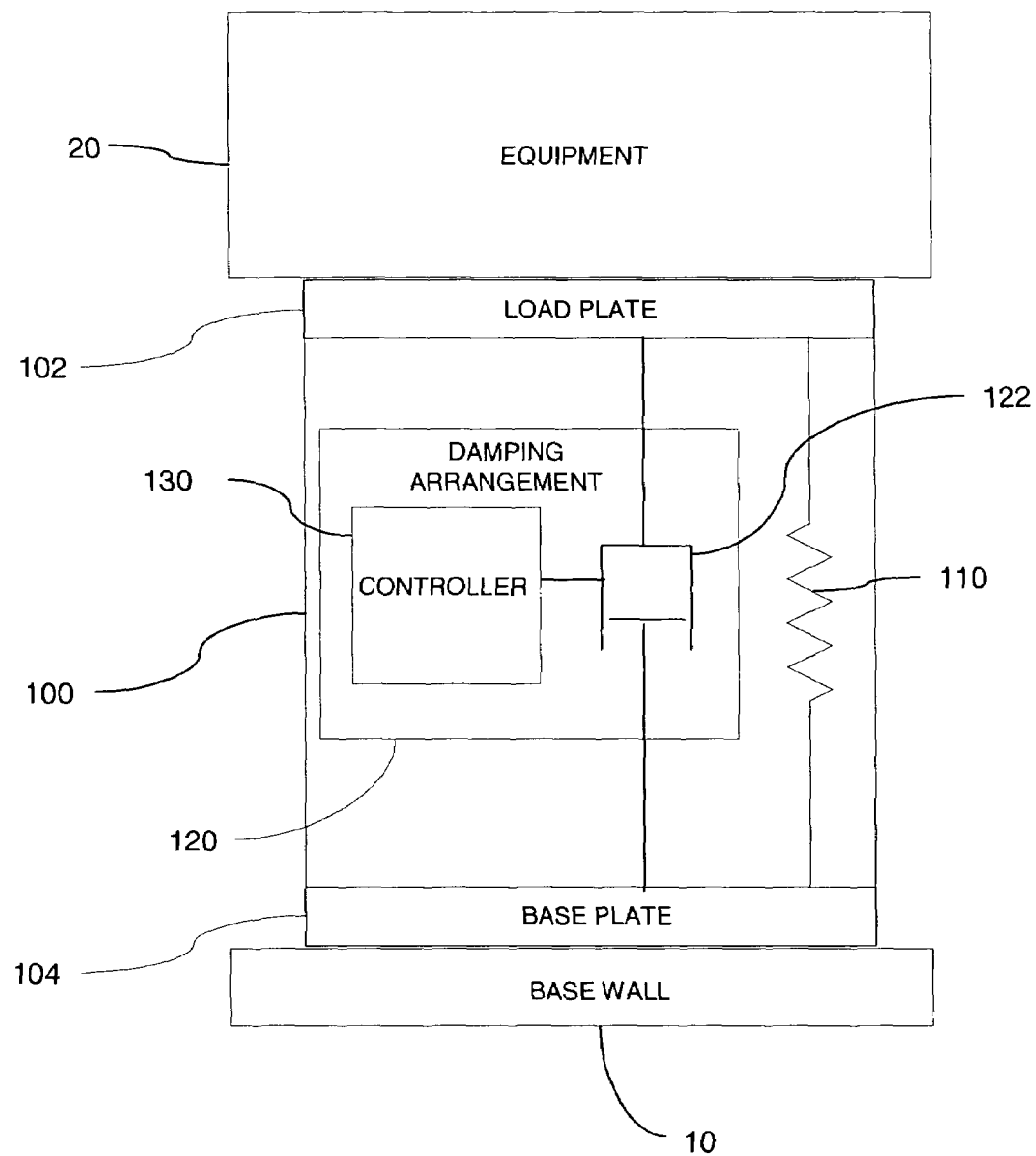
FIG. 1 is a schematic illustration of a shock and vibration isolation system according to an embodiment of the invention.

FIG. 1 is a schematic representation of a shock and vibration isolation system 100 according to an embodiment of the invention. The system 100 is disposed between and connected to a base wall 10 and equipment 20 requiring isolation. As used herein, the term "equipment" means any device, assembly or structure that may be supported by or mounted to the base wall 10. The base wall 10 is representative of a deck, bulkhead, wall or other structural portion of, for example, a ship, aircraft or building. The equipment 20 is representative of equipment that is to be mounted to the base wall 10 and is subject to damage from vibration or shock transmitted to the equipment 20 by the base wall 10 or, alternatively, has the potential for transmission of acoustic energy to the base wall 10.

The isolation system 100 includes a load plate 102 for attachment to the equipment 20 and a base plate 104 for attachment to the base wall 10. The system 100 also includes a passive spring element 110 and a semi-active damping arrangement 120 attached to and disposed between the load plate 102 and the base plate 104. The spring element 110 and the semi-active damping arrangement 120 are mounted in parallel so as to provide both shock and vibration isolation.

The spring element 110 may be designed specifically to protect the equipment from the effects of vibration and to minimize the amount of noise that may be transmitted from the equipment 20 to the base wall 10. For shipboard applications the spring element 110 should provide effective vibration isolation for inputs ranging from about 10 Hz. to about 200 Hz. This can be accomplished by using a "soft" spring element with a natural frequency less than about 10 Hz. In general, the lower the natural frequency, the better the isolation system 100 will perform with regard to vibration isolation over the 10 to 200 Hz. range of interest.

The spring element 110 may comprise virtually any spring or combination of springs that provides an effective isolator to 10 to 200 Hz vibrations and can also survive varying shock inputs. This may include, for example, coil springs, leaf springs or pneumatic springs. Pneumatic or air springs typically have a low natural frequency and thus are well-suited for use in countering shipboard vibration and acoustic inputs. However, they ordinarily tend to behave poorly as shipboard shock isolators due to the fact that events such as underwater explosions tend to drive the spring into resonance following the initial transient.

Isolation against shock requires a mechanism for minimizing the effects of near instantaneous acceleration of the base wall 10. This can be provided by the damping arrangement 120, which is disposed between the base wall 10 and the equipment 20. The damping arrangement 120 provides a reactive force that can reduce the effects of the shock-magnitude base wall acceleration on the equipment 20. For a given set of equipment characteristics (e.g., the mass and center of gravity of the equipment 20) and shock inputs, the reaction force supplied by the damping arrangement 120 can be optimized to reduce specific output parameters such as the magnitude of displacement of the equipment 20 or the acceleration of the equipment 20.

The damping arrangement 120 can thus be designed so as to provide an optimum reaction to a particular scenario. A permanently fixed damping arrangement so designed, however, would virtually eliminate the effectiveness of the spring element 110. The ideal damping arrangement is one wherein the reaction force provided can be varied. This could be provided by an active control mechanism that provides counteracting forces to the equipment 20. Active control mechanisms, however, may be expensive, complex, and, under certain circumstances, can introduce instability to the system.

Accordingly, embodiments of the present invention use a semi-active damper 122 that provides a variable reaction force that can be controlled so as to nearly match the optimum reaction force as it varies with time. The semi-active damper 122 is mounted intermediate the base plate 104 and the load plate 102 in parallel with the spring element 110. The semi-active damper 122 should be capable of high-speed variation of the reaction force in response to detection of shock inputs at the base plate. Examples of semi-active dampers that may be used include but are not limited to magnetorheological (MR) fluid dampers, electrorheological (ER) fluid dampers, magnetorheological elastomer dampers and conventional hydraulic dampers configured to allow control of the reaction force of the damper. MR fluid dampers are particularly suited for use in the damping arrangement 120 because they are capable of producing high, variable damping forces with very low power requirements, particularly as compared to ER dampers.

The semi-active damper 122 is driven by a controller 130 that determines the optimum reaction force based on measurements of the relative displacement between the base wall 10 and the equipment 20 and/or relative velocity or acceleration of the base wall 10 and the equipment 20.

The controller 130, which may include an internal power supply or may be externally powered, uses a control algorithm to selectively command the semi-active damper 122 to provide the desired reactive force. This reactive force can be constantly updated to maximize (or minimize) the damping effect on the motion of the equipment 20. The relative displacement between the load plate 102 and the base plate 104 and acceleration data for the load plate 102 and the base plate 104 may be provided by conventional accelerometers and linear measurement devices.

The semi-active damper 122 is attached to both the load plate 102 and base plate 104. It is therefore desirable to minimize the baseline, unpowered damping effect of the semi-active damper 122. The degree of damping when the damping arrangement 120 is unpowered is preferably low enough to allow the passive spring element 110 to achieve full effectiveness with respect to vibration isolation. Maintaining a low baseline damping level also provides a failsafe mechanism that can provide a degree of damping even under a failure of the system's power supply.

As an alternative to maintaining a low baseline damping level, the damping arrangement 120 may be configured so that the semi-active damper is not attached to the load plate 102, the base plate 104 or both until the system 100 detects a shock input. For example, the damping arrangement 120 could be configured to include one or more clamping or latching mechanisms that engage the end or ends of the semi-active damper 122 for attachment to the base plate 104 or load plate 102 upon detection of a shock input. In this embodiment, the damper 122 would have no effect on vibration-only performance because there would be no reaction force applied.

Figure 2:
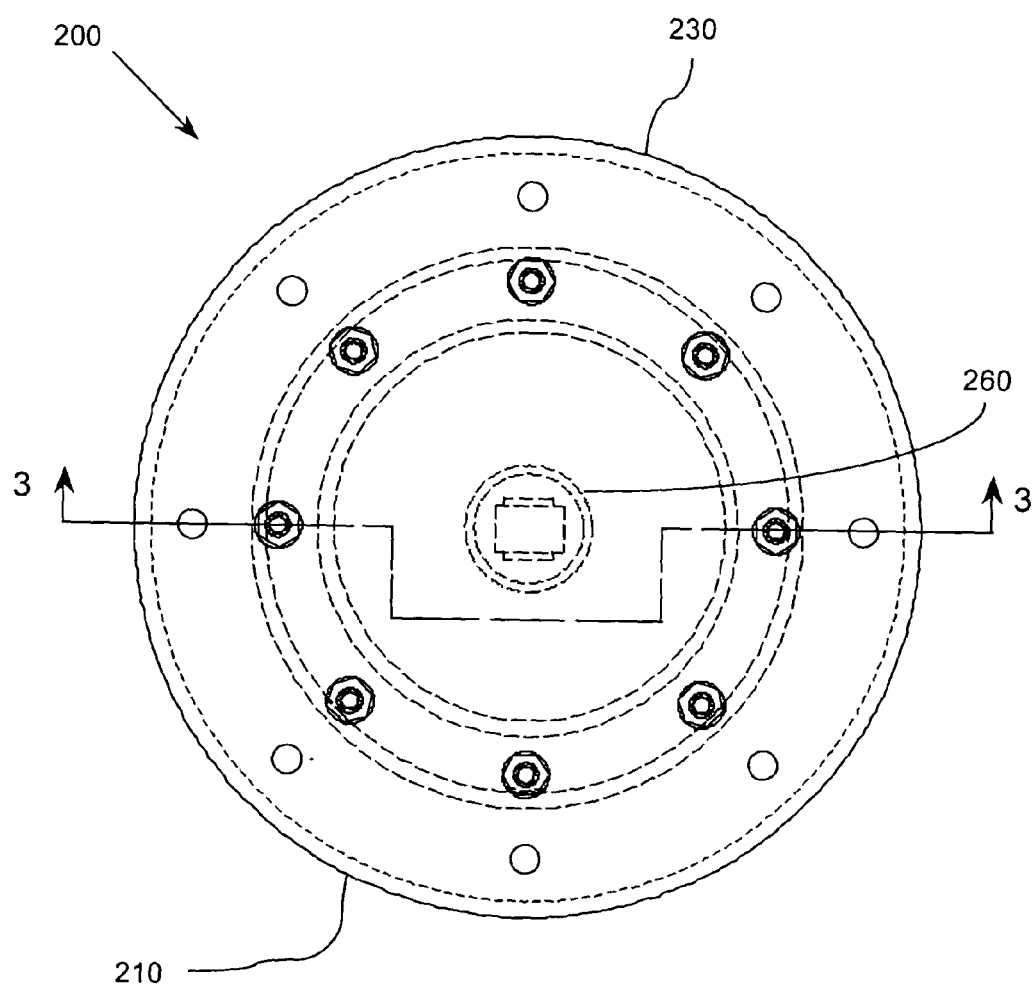
FIG. 2 is a top view of a shock and vibration isolation system according to an embodiment of the invention.
Figure 3:
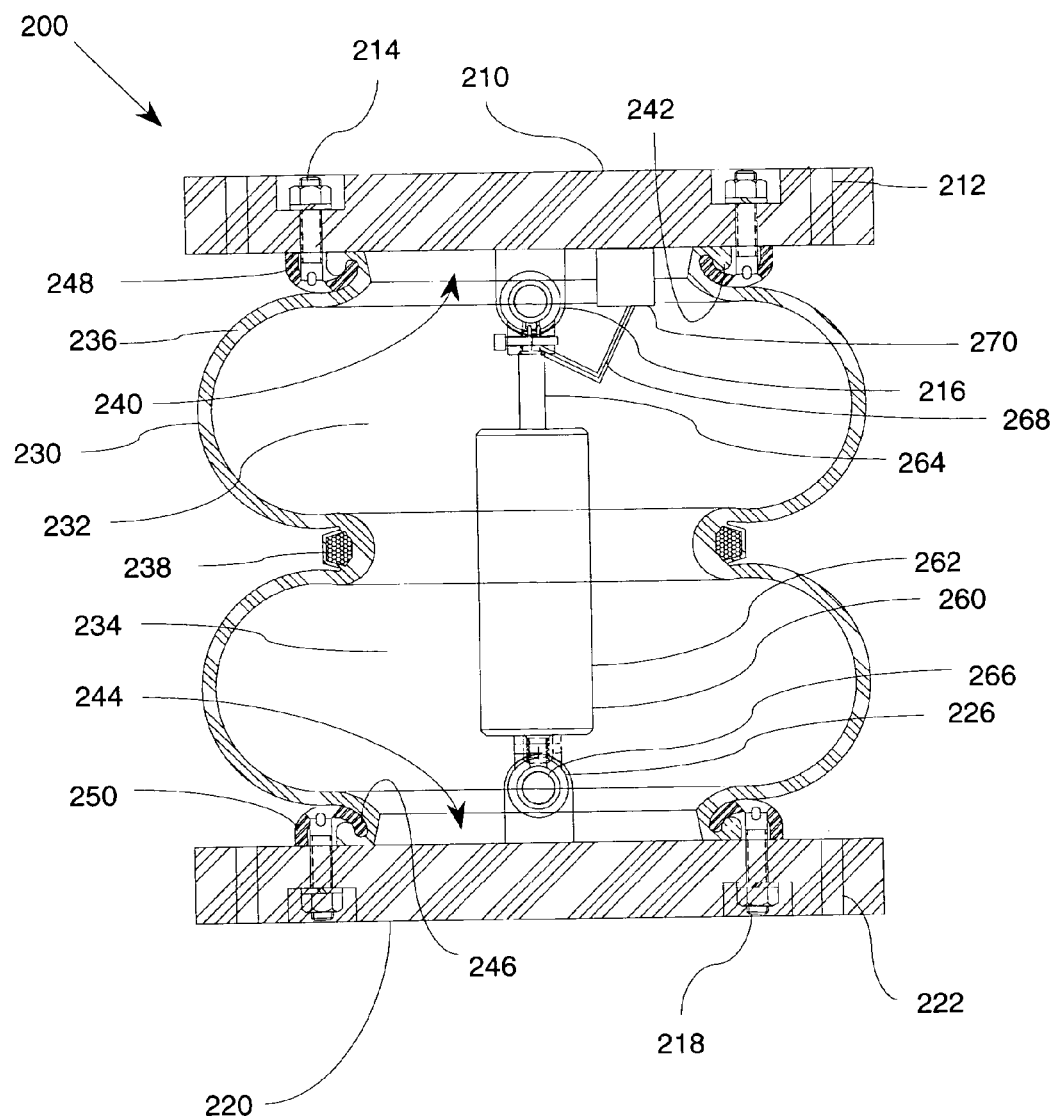
FIG. 3 is a section view of the shock and vibration isolation system of FIG. 2.

Turning now to FIGS. 2 and 3, an exemplary shock and vibration isolation system 200 combines an air spring 230 with an MR fluid damper 260 mounted in parallel through the center of the air spring 230. The air spring 230 and the MR fluid damper 260 are mounted in parallel between a load plate 210 and a base plate 220. The shock and vibration isolation system 200 also includes a controller 270 in electrical communication with the MR fluid damper 260.

As shown in FIG. 2, the air spring 230 is generally circular. The air spring 230 includes a pair of chambers 232, 234 formed by an elastomeric bladder 236 cinched by a centrally located belt 238. The bladder 236 has an upper opening 240 surrounded by an upper bead 242 and a lower opening 244 surrounded by a lower bead 246. The upper opening 240 is sealed by a clamp 248 to the load plate 210, which can be attached to the equipment or structure to be isolated. The clamp 248 is secured to the load plate 210 by a series of bolts 214. The lower opening 244 is sealed by a clamp 250 to the base plate 220. The clamp 250 is secured to the base plate 220 by a series of bolts 218.

The base plate 220 is generally parallel to the load plate 210 and is configured for attachment to a base wall. The load plate 210 and the base plate 220 are illustrated with mounting holes 212 and 222 through which bolts or other fasteners can be used to attach the load and base plates 210, 220 to the structures of interest. It will be understood by those of ordinary skill in the art that any fastener may be used that rigidly fixes the load and base plates 210, 220 to their respective structures. The load and base plates 210, 220 may also be permanently attached such as by welding, for example.

It will be understood that the air spring 230 may be any gas or air pressure-based spring having suitable vibration isolation performance. An exemplary two chamber convoluted pneumatic spring that may be used in the present invention is the Model 20 Airmount® isolator produced by the Firestone Industrial Products Co. This spring has a natural frequency of about 2.0 Hz. at a pressure of 40 psig.

The MR fluid damper 260 has a cylindrical housing 262 that houses a fluid chamber with magnetorheological fluid contained therein. An attachment eye 266 extends downward from one end of the housing 262. The attachment eye 266 is pivotally attached to a bracket 226 attached to the base plate 220. The MR fluid damper 260 has a shaft 264 that is attached to a piston disposed within the fluid chamber. The opposite end of the shaft 264 is pivotally attached to a bracket 216 attached to the load plate 210.

Mounting the MR fluid damper 260 in the interior of the air spring 230 provides a simple, relatively compact shock isolation system. It will be understood by those of ordinary skill in the art, however, that any configuration may be used in which the MR fluid damper 260 and the air spring 230 are mounted in parallel between the base plate 220 and the load plate 210. For example, it may be possible to configure an air spring (or other spring) that could be disposed internal to the MR fluid damper.

The operative characteristics of MR fluid dampers such as the MR damper 260 are known in the art. MR fluid dampers typically use an electromagnetic coil wrapped around the piston to effect viscosity changes in a magnetorheological fluid inside the chamber of the damper. This changes the reactive force transmitted through the piston to the shaft. In the MR fluid damper 260, the electromagnetic coil is energized through lead lines 268 that are electrically connected to a damper controller 270 mounted to the load plate 210. The damper controller 270 may alternatively be mounted to the base plate 220. The damper controller 270 may also be mounted external to the isolation system 200.

The present invention can utilize any semi-active damper that can provide the required reactive force within a time interval sufficient to reduce the reaction of the load plate 210 to a shock-induced movement of the base plate 220. A suitable MR damper for at least some applications of the invention is the Rheonetic™ Model RD-1003, produced by Lord Corporation. This damper provides a maximum reactive force of at least 650 pounds when fully energized and less than 150 pounds of reactive force when not energized. It uses an input current of about 1.0 amp from a 12 V DC power source. It will be understood that multiple MR dampers 260 may be used in conjunction with a single spring element in order to provide a sufficient reaction force.

Figure 4:
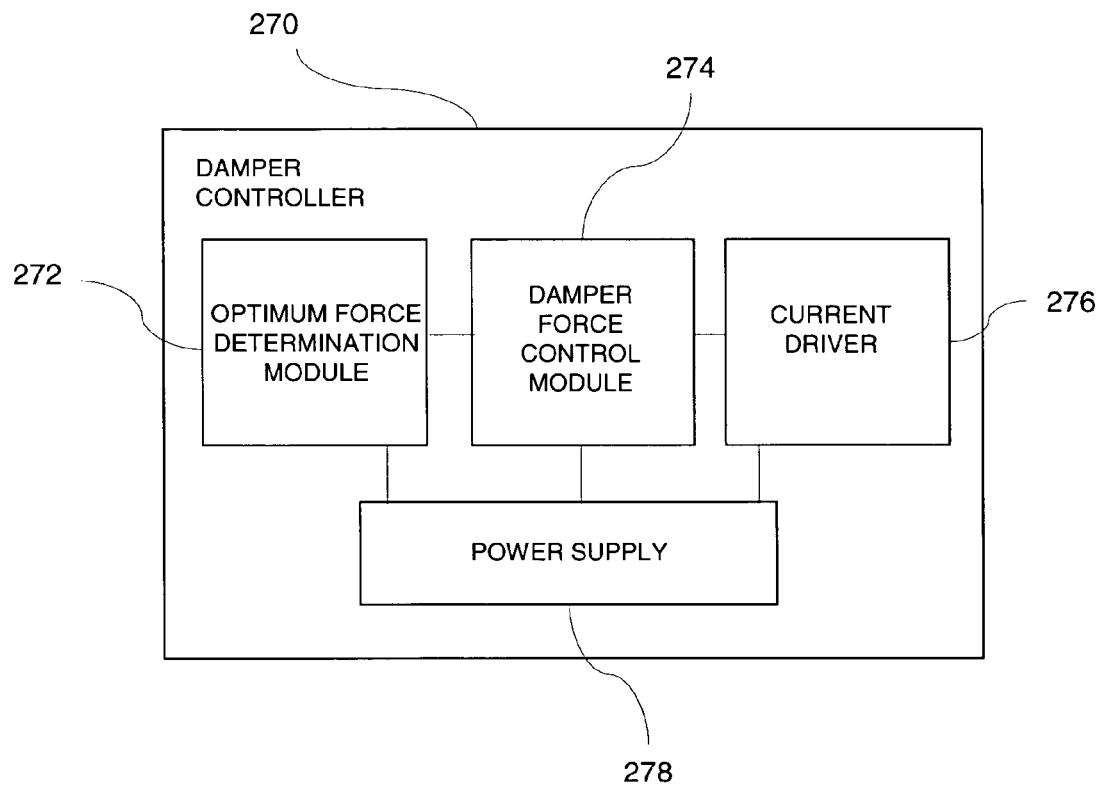
FIG. 4 is a block diagram of a damper controller of a shock and vibration isolation system according to an embodiment of the invention.

A block diagram of a damper controller 270 is shown in FIG. 4. The damper controller 270 includes a damper force control module 274 and a current driver 276. Depending on the control methodology, the damper controller 270 may also include an optimum force determination module 272. The damper controller 270 may also include a power supply 278. Alternatively or in addition, the damper controller 270 may be electrically connected to an external power supply.

Control Algorithms

Many control algorithms have been suggested in the literature for the semi-active control of MR dampers. While any of these algorithms can be used, several have been showed to be particularly adaptable to the isolation systems of the present invention. One such algorithm is the Clipped Optimal Control Algorithm (COCA), which uses a Linear Quadratic Regulator (LQR) scheme to calculate an optimal control (i.e., damper) force. This calculated control force is optimal with respect to some cost function as will be discussed hereafter.

An inherent difficulty with MR damper control is that the damper force cannot be specified, only the voltage applied to the current driver. To overcome this, the LQR scheme uses the following logic:

- If the actual damper force is less than the optimal damping force AND the forces have the SAME sign, then the voltage applied to the current driver is set to the maximum voltage.
- If the actual damper force equals the optimal damper force, then the voltage applied to the current driver remains at the present level.
- If neither of the above conditions applies, then the voltage applied to the current driver is set to zero.

Mathematically this logic can be described as, $$v = V_{max} H\{(f_{opt} - f)f\}$$ (Eq. 1)

where v is the applied voltage, $V_{max}$ is the maximum voltage, $f_{opt}$ is the optimal damper force, f is the measured (or calculated) damper force and H is the Heaviside step function.

LQR allows the control designer to determine a set of optimal gains that will minimize a user defined cost function. The cost function can be written in terms of the output, which allows the designer to explore trade-offs between the actual output and/or the control effort (damper force). Mathematically the cost function to be minimized is, $$V = \int_0^\infty Qy^T y + Ru^T u \, dt$$ (Eq. 2)

where y is the output, u is the damper force, and Q and R are weighting matrices. The calculated optimal gains minimize this cost function. By varying Q and R the designer can effectively tune the isolation system to minimize, or explore trade-offs between, the relative displacement across the isolation system, the absolute acceleration of the isolated mass, and/or the damper force. This allows the isolation system to be tuned to minimize a parameter of interest, or re-tuned to account for variations in isolated mass and/or center of gravity of the isolated mass. The former is useful in developing the optimal isolation system for a given piece of equipment and the latter is useful for equipment cabinets that contain equipment that has been replaced or upgraded. With a two year typical refresh for electronic equipment, it is certain that the isolation system for an equipment rack will need to be re-evaluated or replaced many times during its lifetime.

The damper controller 270 can only control the damper force, not the base excitation. Therefore, the optimal damper force is calculated using the damper force as the only input to the isolated mass. The optimal gains can be calculated using output weighing. Once the optimal gains $G_1$ and $G_2$ are known, the optimal damping force can be calculated from, $$F_{Opt} = G_1 X_{Rel} + G_2 V_{Rel}$$ (Eq. 3)

Where:
- $X_{Rel}$ is the relative displacement between load plate 210 and base plate 220
- $V_{Rel}$ is the velocity of load plate 210 relative to base plate 220 which can then be used with the measured (or calculated) damper force and Eq. 1 to determine the input voltage v to the current driver. The damper force can be measured, or calculated from the equations of motion using, $$f = m(\ddot{x} + 2\zeta\omega\dot{x}_r + \omega x_r)$$ (Eq. 4)

The optimum force determination module 272 can use either displacement data or acceleration data versus time to determine the instantaneous relative displacement and relative velocity for the shock and vibration isolation system 200. Displacement data may be provided by, for example Linear Variable Differential Transformers (LVDTs) mounted between the load plate 210 and the base plate 220. Acceleration data may be provided by accelerometers mounted to the load plate 210 and the base plate 220.

The optimum force determination module 272 may include a programmable digital processor that can be reprogrammed in the field. Alternatively or in addition, the optimum force determination module 272 may include modular analog circuitry that is easily replaceable in the field.

The current driver 276 is used to energize the MR damper using predetermined current levels. In the clipped optimal control methodology, the current driver 276 is configured to provide either zero current or full-scale current only depending on commands from the damper force control module 274. The command from the damper force control module 274 depends on a comparison of the actual damper reaction force to the optimum force, which may be measured or derived from acceleration and displacement data. If the optimum force and the actual force have the same sign and the actual damper force is less than the optimal damper force, the force control module 274 signals the current driver 276 to transmit full-scale current to the MR damper. If the two forces are substantially equal, the control module 274 maintains the previous current level (either zero or full-scale). Under all other conditions, the current level is commanded to zero. The time required to execute the algorithm and cycle the damper force control module 274 must be significantly less than the duration of the shock event, which is typically on the order of a millisecond or less. It will be understood by those having ordinary skill in the art that the clipped optimal algorithm avoids the necessity of computing an intermediate current level intended to provide the optimum force directly.

The optimum damper force is dependent on the mass and center of gravity of the equipment being protected by the shock and vibration isolation system 200. If the equipment is modified or replaced, the optimum damping force is changed. This would ordinarily require replacement of the isolation system or at least a change to the damping mechanism. A significant advantage of the isolation systems of the present invention is that changes to the equipment can be accounted for without replacing the shock and vibration isolation system 200 and without changes to the MR damper 260 or the spring element. Instead, such changes may be accounted for by changing the gains used in the calculations of the optimum force determination module 272. If a digital processor is used to make the optimum force calculations, the change can be accomplished through a simple programming change. If analog circuitry is used, the circuitry can be configured as a compact module that is easily replaceable with another module configured for calculations using updated gains.

The shock and vibration isolation system 200 may also be made self-adapting by programming the optimum force determination module 272 to perform its own calculation of the gains based on the user supplied cost function (Eq. 2). The optimum force determination module 272 may be further programmed to identify changes in the mass of the equipment based on relative positions of the load plate 210 and the base plate 220 in the steady state condition. A change in the steady state distance between the plates 210, 220 would indicate a change in the mass supported by the isolation system. It should be noted that the self-adapting feature can be used whenever the isolation system 200 is oriented so as to provide vertical support. If the isolation system 200 is angled, for example, the optimum force determination module 272 may be programmed to account for the effect of multiple degrees of freedom.

One disadvantage of the clipped optimal control methodology is that it requires at least two sensors. A control algorithm that requires only one sensor involves the use of velocity feedback. This algorithm can be used to achieve similar performance to the clipped optimal algorithm while allowing simplification of the instrumentation.

The implementation of the velocity feedback controller is simple. A voltage is fed to the current driver 276 that is proportional to the velocity of the load plate 210 relative to the base plate 220. A gain is applied to the relative velocity signal such that the maximum voltage to the MR damper 260 corresponds to the peak relative velocity expected from the given input. Significantly, this control methodology only requires the measurement of the relative velocity, which can easily be determined with a Linear Velocity Transducer (LVT).

A novel approach to MR damper control involves the use of an Acceleration Bang-Bang (ABB) methodology. The ABB approach has been shown to be very effective in controlling an MR damper with shock inputs representative of those that might be experienced shipboard. The methodology has the added advantage of allowing above-mount peak accelerations to be preset and mount deflections to be minimized subject to the selected above mount acceleration. This is a very desirable feature in shipboard applications as the designer can specify the above mount environment while simultaneously minimizing rattle space. This is vital in shipboard applications, particularly onboard submarines, where space is often at a premium.

The principle behind ABB control is as follows. Prior to a shock event, the MR damper 260 not activated so that the spring 230 can provide the most effective vibration isolation performance. At the instant that a shock is detected, the maximum voltage is applied to the damper 260 unless the above-mount absolute acceleration exceeds a preset value. If the above mount acceleration exceeds the preset value, the damper is switched off until the acceleration level again falls below the acceptable level, whereupon the damper is again switched full on. This process continues throughout the shock event. Mathematically, this control algorithm can be described as:

$$V = \begin{cases} V_{max}, & |\ddot{x}| < A * |\ddot{z}| < B \\ 0, & |\ddot{x}| \geq A + |\ddot{z}| \geq B \end{cases} \quad (Eq. 5)$$

where $\ddot{x}$ and $\ddot{z}$ are the measured above mount absolute accelerations in the x and z directions, respectively, v is the voltage applied to the MR damper current driver 276, $V_{max}$ is the voltage applied to the current driver that results in the maximum damping force, and A and B are the prescribed acceleration limits in the in the x and z directions, respectively.

The implementation of the ABB control methodology is simple in that it requires only a biaxial accelerometer to sense the above mount accelerations and a simple on-off controller to switch the damper on and off according to the sensed acceleration.

Power Supply and Self-Powering Feature

The power requirements for a semi-active device such as a MR damper are relatively small compared to the requirements of an active isolation system. Under normal circumstances, the MR dampers of isolation systems according to the invention are not energized. For example, only upon receiving a shock input through the base wall 10 will the damper force control module 274 of the isolation system 200 command the MR damper 260 to be energized. When full-scale reaction force is commanded, an RD-1003 damper draws only 2 amps from a 12 V DC source. Further, the duration of a shock event and thus the maximum duration of damper energization is generally on the order of only 1.5 seconds.

The power supply 278 may be any electrical storage device such as a battery that is capable of supplying a 2 amp current for approximately 1.5 seconds. In order to provide for multiple events, however, the battery should have additional storage capacity or be rechargeable. Alternatively, one or more capacitors may be used.

Figure 5:
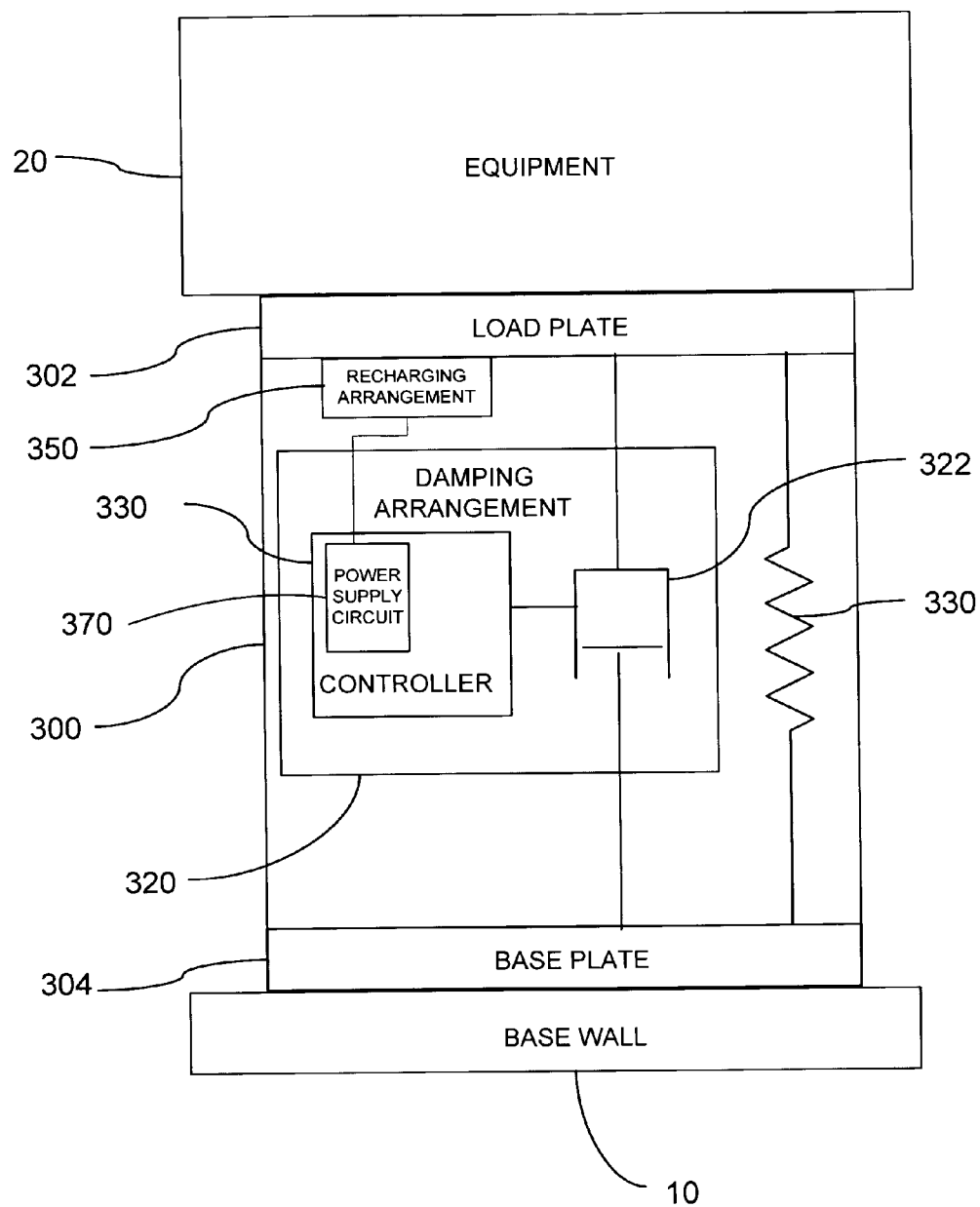
FIG. 5 is a schematic illustration of a self-powering shock and vibration isolation system according to an embodiment of the invention.
Figure 6:
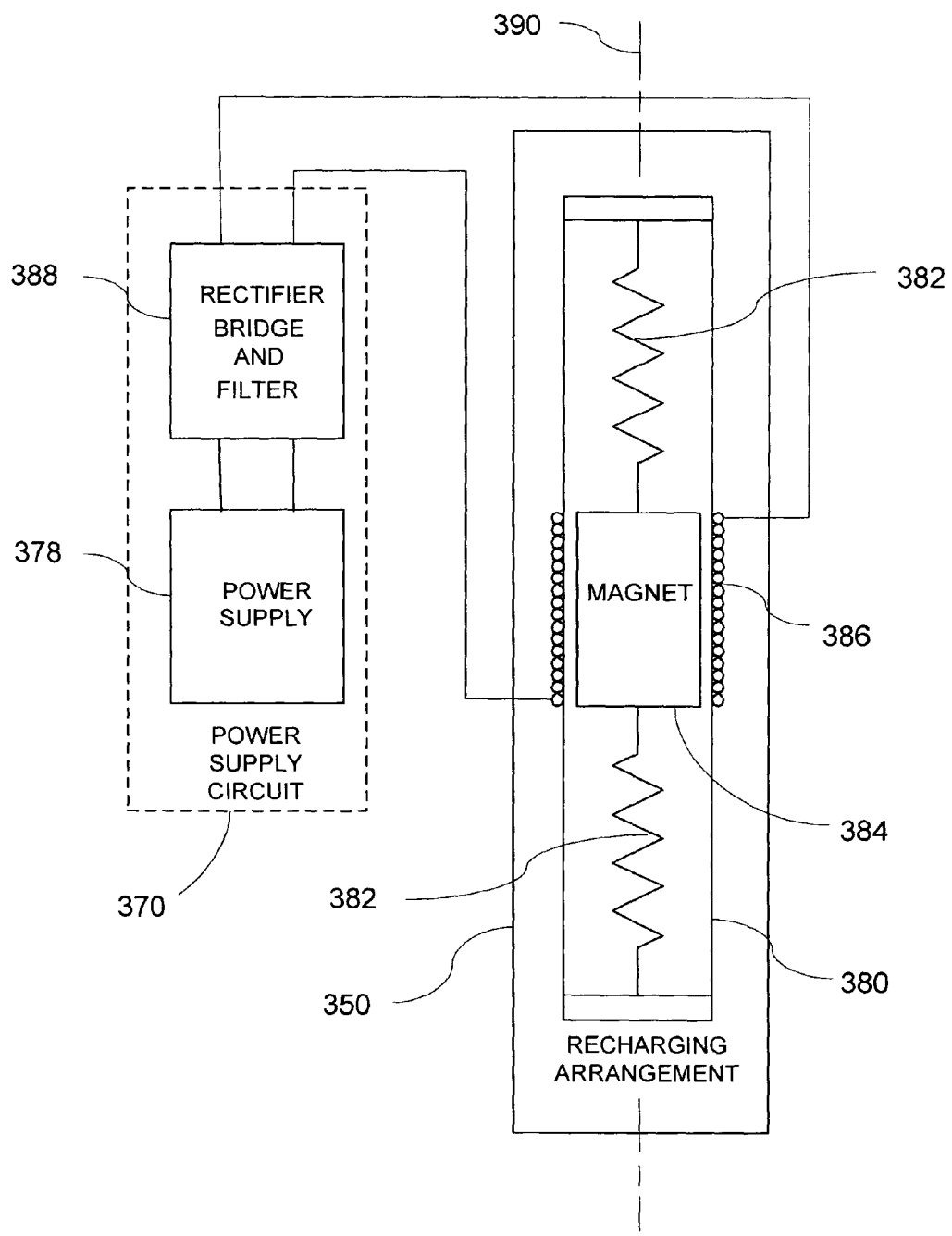
FIG. 6 is a schematic illustration of a recharging arrangement and a power supply circuit that may be used in a shock and vibration isolation system according to an embodiment of the invention.

The power supply 278 may be configured to be rechargeable from an external source in any conventional manner. The present invention, however, provides a self-powering feature that can be used with small rechargeable batteries or capacitors. With reference to FIGS. 5 and 6, a shock and vibration isolation system 300 according to an embodiment of the invention includes a spring 310 and a semi-active damper 322, which may be an MR fluid damper or an ER fluid damper. The spring 310 may be an air spring or other spring having suitable low frequency characteristics. The spring 310 and the semi-active damper 322 are mounted in parallel between a load plate 302 and a base plate 304. The shock and vibration isolation system 300 also includes a controller 330 in electrical communication with the semi-active damper 322.

Operation of the isolation system 300 is substantially identical to that of the previously discussed systems. The isolation system 300, however, includes a recharging arrangement 350 attached to the load plate 302. The recharging arrangement 350 converts the ordinary vibratory motion of the load plate 302 to electrical energy that can be stored in the power supply 378 for use in powering the semi-active damper 322 in the event that a shock load is received.

FIG. 6 is a schematic illustration of a recharging arrangement 350 according to one embodiment of the invention. The recharging arrangement 350 includes a spring/mass system 380 that can be attached to the load plate 302 or to the equipment or structure mounted to the load plate 302. The mass 384 of the spring/mass system 380 is or includes a magnet and is attached to one or more springs 382. The springs 382 are configured so that vibration of the recharging arrangement 350 causes the magnet to oscillate along the axis 390 of the system. One or more electrical coils 386 are disposed along the axis 390 around the magnet/mass 384. The oscillatory motion of the magnet/mass 384 induces a current in the electrical coils 386 which is passed through a rectifier bridge/filter 388 to the power supply 378. The power supply 378 may be any suitable power storage arrangement such as a battery or a capacitor bank.

The spring/mass-based recharging arrangement may be tuned to the resonance frequency of the overall shock and vibration isolation system 300 in order to maximize the amplitude of the oscillations and enhance the current generation of the arrangement.

It will be understood that the recharging arrangement 350 may be mounted above or below the load plate 302 or may, alternatively, be mounted to the equipment 20. Another alternative is to mount the recharging arrangement to the base plate 304 instead of the load plate 302. However, the vibratory motion of the base plate 304 is likely to be relatively small compared to the motion of the load plate 302 and may be too small to adequately charge the power supply 378. A DC-DC converter could be used step up the voltage to an acceptable level.

Another aspect of the invention provides a recharging arrangement that makes use of a piezoelectric generator to scavenge the minute amplitude vibrations found in shipboard applications. To understand why this device is ideally suited to this application requires insight into the transfer of power between the input (source) and the generator (load). Analogous to the result found in electrical circuit theory, the maximum power is transferred from the source to the load when the magnitudes of the source and load mechanical impedances are equal. For this application, the source is a small displacement, low frequency, large amplitude force. Thus, the source impedance is relatively large. The impedance of the piezoelectric generator is also large, making it a good impedance match to the available source. The result of this source-load impedance matching is highly efficient power transfer.

Figure 7A:
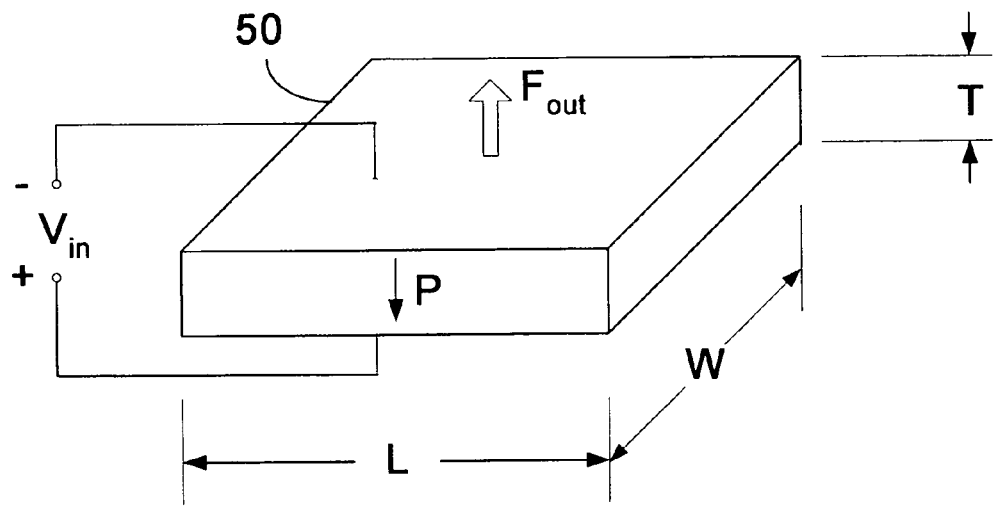
FIG. 7A is a perspective view of a piezoelectric crystal undergoing an applied charge.
Figure 7B:
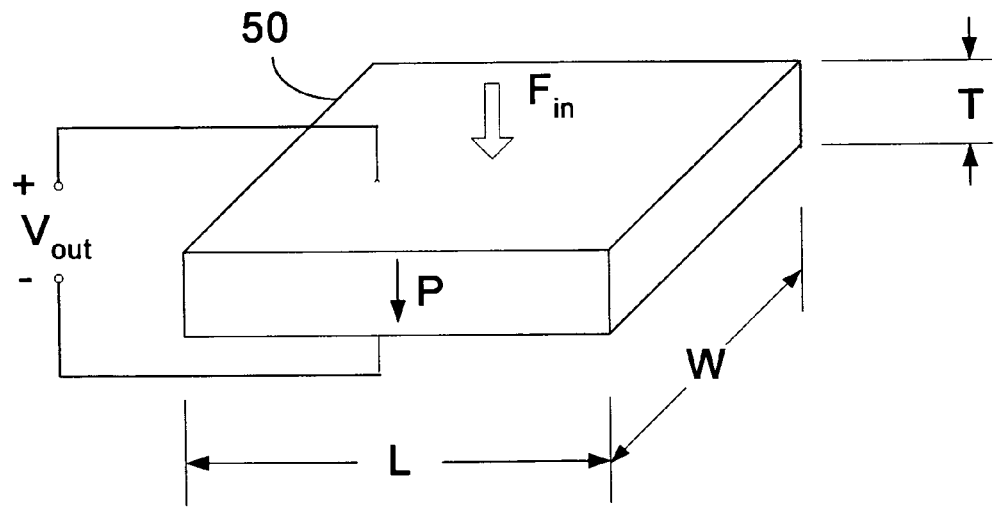
FIG. 7B is a perspective view of the piezoelectric crystal of FIG. 7A undergoing an applied normal force.

FIGS. 7A and 7B illustrate the basic function of a piezoelectric material. A piezoelectric material is one that changes its dimensions when stressed electrically by a voltage. FIG. 7A illustrates that when a voltage V (or charge) is applied to a rectangular piezoelectric crystal 50 there is a tendency for the length L, width W and thickness T to expand. For any given crystal 50 there is a polarity P which determines the polarity of the voltage V that must be applied to cause the material to expand. If the crystal 50 is constrained when the voltage V is applied, a force $F_{Out}$ is exerted by the material. Conversely, when the crystal 50 is stressed mechanically by a force $F_{in}$, the crystal 50 generates a charge, as shown in FIG. 7B. If electrodes are placed on the appropriate opposing faces of the piezoelectric crystal 50 and the electrodes are not short-circuited, a voltage $V_{Out}$ associated with the charge is produced. This behavior is termed the piezoelectric effect and these materials are commonly referred to as piezoelectric materials. Thus, a piezoelectric is capable of acting as either an actuator, or a generator, or both.

A single layer of piezoelectric material can produce several hundred Volts for a reasonably small force input, but the charge produced is very small. Since current i is the time derivative of the charge Q, $$i = \frac{dQ}{dt} \quad \text{(Eq. 6)}$$

a small charge equates to a small current from the piezoelectric generator. Since it is desirable to maximize the amount of current produced by the device it is useful to look at the mathematical relationships that govern a piezogenerator. The output charge Q of a piezoelectric crystal is directly proportional to the applied force F:

$$Q = d_{33}F \quad \text{(Eq. 7)}$$

The constant of proportionality $d_{33}$ is known as the piezoelectric strain constant and the 33 subscript implies that the constant is associated with a force applied in line with the axis of polarization. This is the most efficient orientation in terms of charge generation and hence this is the orientation that will be utilized in this experiment.

The voltage produced by a piezogenerator can be derived as follows: The stress $\sigma$ in a piezoelectric crystal due to an applied force is, $$\sigma = \frac{F}{A} \quad \text{(Eq. 8)}$$

where F is the applied force and A is the cross-sectional area of the crystal. There are two governing equations for piezoelectrics. The first describes the strain produced in the material by an applied electric field and the second describes the electric field produced by a stress on the material. The later is the equation that is needed for this application and the mathematical relationship is, $$\xi = g_{33}\sigma \quad \text{(Eq. 9)}$$

where $\xi$ is the field produced by the stress $\sigma$. $g_{33}$ is a constant related to $d_{33}$ by the relation, $$E = \frac{1}{g_{33}d_{33}} \quad \text{(Eq. 10)}$$

where E is the modulus of elasticity of the piezoelectric material. Therefore, $$\xi = g_{33}\frac{F}{A} \quad \text{(Eq. 11)}$$

The voltage V produced by the strained piezoelectric is, $$V = \xi T \quad \text{(Eq. 12)}$$

where T is the thickness of the material. Therefore, the voltage produced in the piezoelectric by an applied force F is, $$V = \frac{FTg_{33}}{A} = \frac{FTg_{33}}{LW} \Rightarrow \frac{V}{T} = \frac{Fg_{33}}{LW} \quad \text{(Eq. 13)}$$

where L and W are the length and width of the piezoelectric crystal.

Analysis shows that the resulting force in a piezoelectric crystal 50 due to small amplitude ambient shipboard vibrations tend to be small as well. By looking at Equation 13, this implies that the voltages produced by a piezoelectric material subjected to these forces will be small as well. This is still acceptable as only a small voltage (e.g., 12 Volts) is needed to power the semi-active isolation systems of the invention. Since piezoelectric materials are capable of producing hundred of Volts, producing 12 Volts is not a problem. The real problem with piezoelectric devices is the amount of current that can be produced. From Equations 6 and 7, the current produced by a piezoelectric due to an applied force is, $$i = \frac{dQ}{dt} = d_{33}\frac{dF}{dt} \quad \text{(Eq. 14)}$$

but the force in the material is $$F = kx \quad \text{(Eq. 15)}$$

where k is the stiffness of the material and x is the deflection of the material. Substituting Equation 15 into Equation 14 gives, $$i = d_{33}k\dot{x} \quad \text{(Eq. 16)}$$

where $\dot{x}$ is the time derivative of the deflection of the material, or the velocity across the material due to the applied force. Thus, the current produced is a function of the stiffness of the material and the velocity with which the material is deflected.

Figure 8:
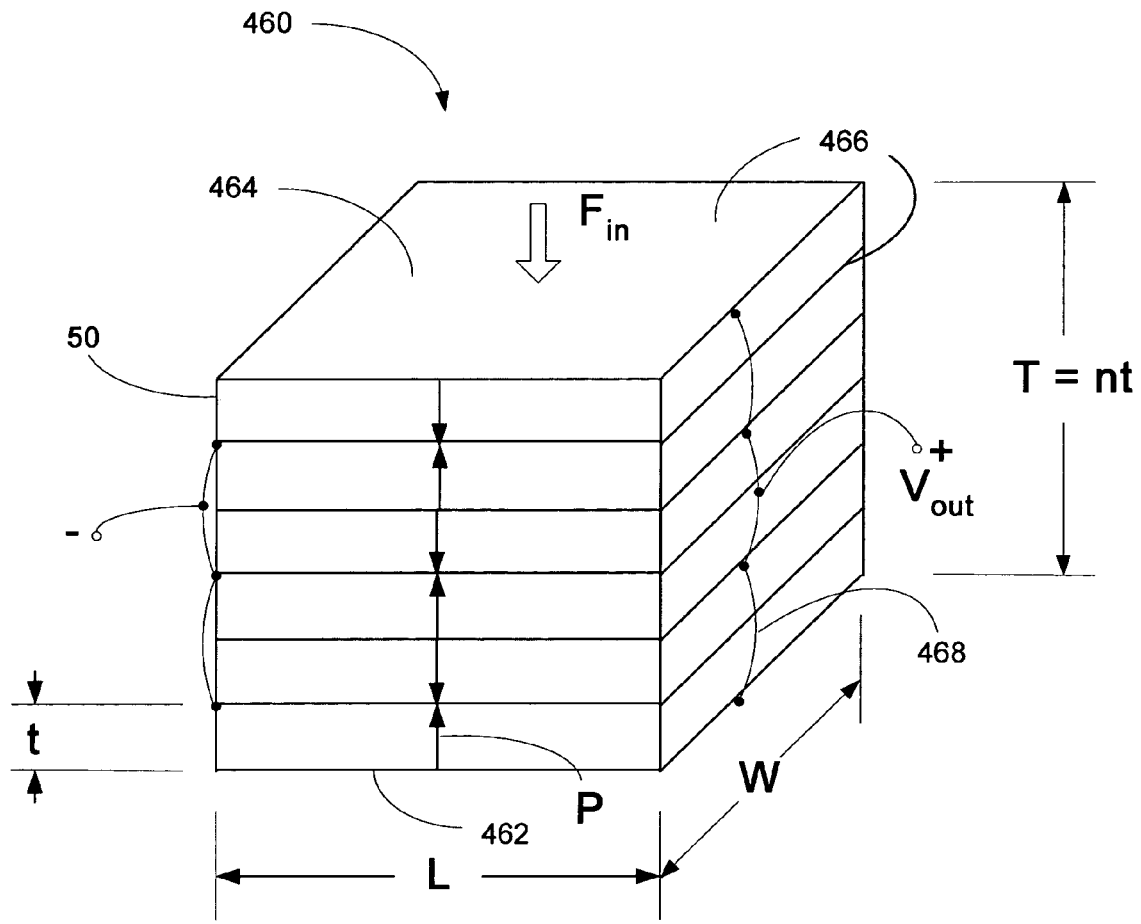
FIG. 8 is a perspective view of a piezoelectric stack generator that may be used in a shock and vibration isolation system according to an embodiment of the invention.

Unfortunately, in the present application, the velocity cannot be varied because it is a function of the available ambient mechanical vibration. Accordingly, the present invention contemplates the use of a plurality of layers of piezoelectric crystals 50 to form a piezoelectric stack generator (PSG) 460 as shown in FIG. 8. The crystals 50 are arranged with alternating polarity directions so that the generated current is additive. Conductive plates 466 are positioned between the crystals, above the top-most crystal and below the lowermost crystal. Conductive jumpers 468 interconnect the conductive plates so that the crystals 50 are wired in parallel. Any number n of crystals 50 may be used. In a PSG 460 having n crystals 50, each with a thickness of t and a polarization direction P, a given force $F_{in}$ applied to the PSG will produce essentially identical currents in the individual crystals 50. With the crystals 50 connected in parallel, these currents can be summed to increase the total current output of the piezoelectric generator. Although increasing the overall thickness T, and adding material between the layers may decrease the stiffness which, in turn, may lower the current output slightly, the increased current obtained by summing the currents produced by each layer far outweighs the effect of the decreased stiffness.

Figure 9:
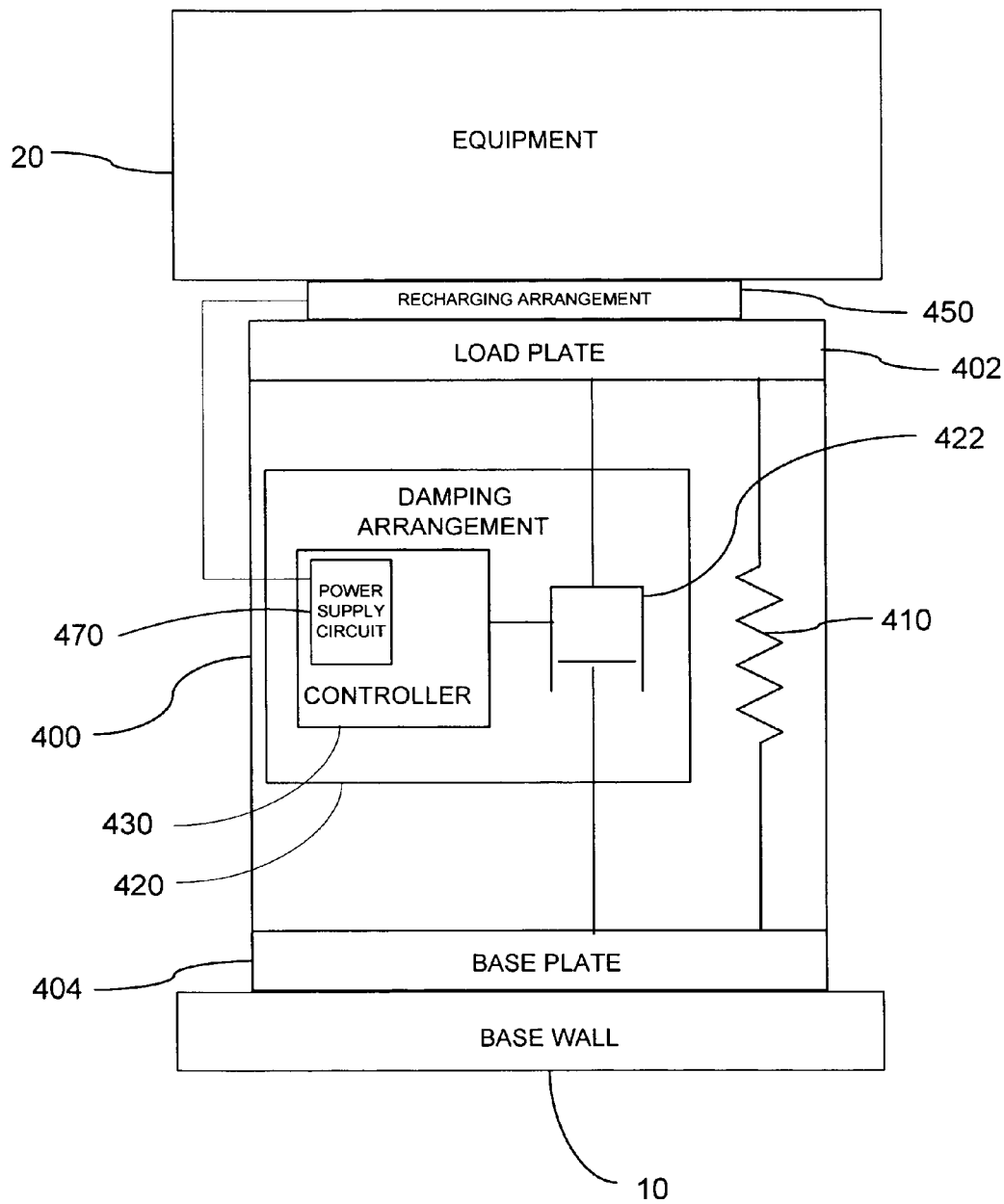
FIG. 9 is a schematic illustration of a self-powering shock and vibration isolation system according to an embodiment of the invention.

FIG. 9 illustrates a shock and vibration isolation system 400 according to an embodiment of the invention that uses a piezoelectric recharging arrangement 450 to produce power for storage in a power supply 478. As in previous embodiments, the shock and vibration isolation system 400 includes a low frequency spring 410 and semi-active damper 422, which may be an MR fluid damper or an ER fluid damper, mounted in parallel between a load plate 402 and a base plate 404. The shock and vibration isolation system 400 also includes a controller 430 in electrical communication with the semi-active damper 422.

Operation of the isolation system 400 is again substantially identical to that of the previously discussed systems. The isolation system 400, however, includes a piezoelectric recharging arrangement 450 mounted to the load plate 402. The piezoelectric recharging arrangement 450 includes one or more piezoelectric generators 480 positioned between the load plate 402 and the equipment 20 mounted thereto. As did the spring-mass system 380 of the recharging arrangement 350 shown in FIG. 6, the one or more piezoelectric generators 480 convert the ordinary vibratory motion of the load plate 402 and the equipment 20 to electrical energy that can be stored in the power supply 478 for use in powering the semi-active damper 422 in the event that a shock load is received.

Each piezoelectric generator 480 may include one or more piezoelectric layers or crystals 50 configured and positioned so that its lower surface 462 engages the load plate 402 and its opposing upper surface 464 engages the equipment 20 or an additional equipment support (not shown). Accordingly, vibratory motion of the load plate 402 and the supported equipment results in reaction forces in the piezoelectric generator 480, causing it to produce an output voltage. To increase the voltage produced, the piezoelectric generators 480 may comprise one or more PSGs 460 formed from a plurality of piezoelectric crystals 50.

In alternative embodiments, the recharging arrangement 450 may be mounted to other components that experience vibration. The recharging arrangement 450 may, for example, be positioned intermediate the base plate 404 and the base wall 10. As previously noted, however, the vibratory motion of the base plate 404 is likely to be relatively small compared to the motion of the load plate 402 and may be too small to adequately charge the power supply 478.

Figure 10:
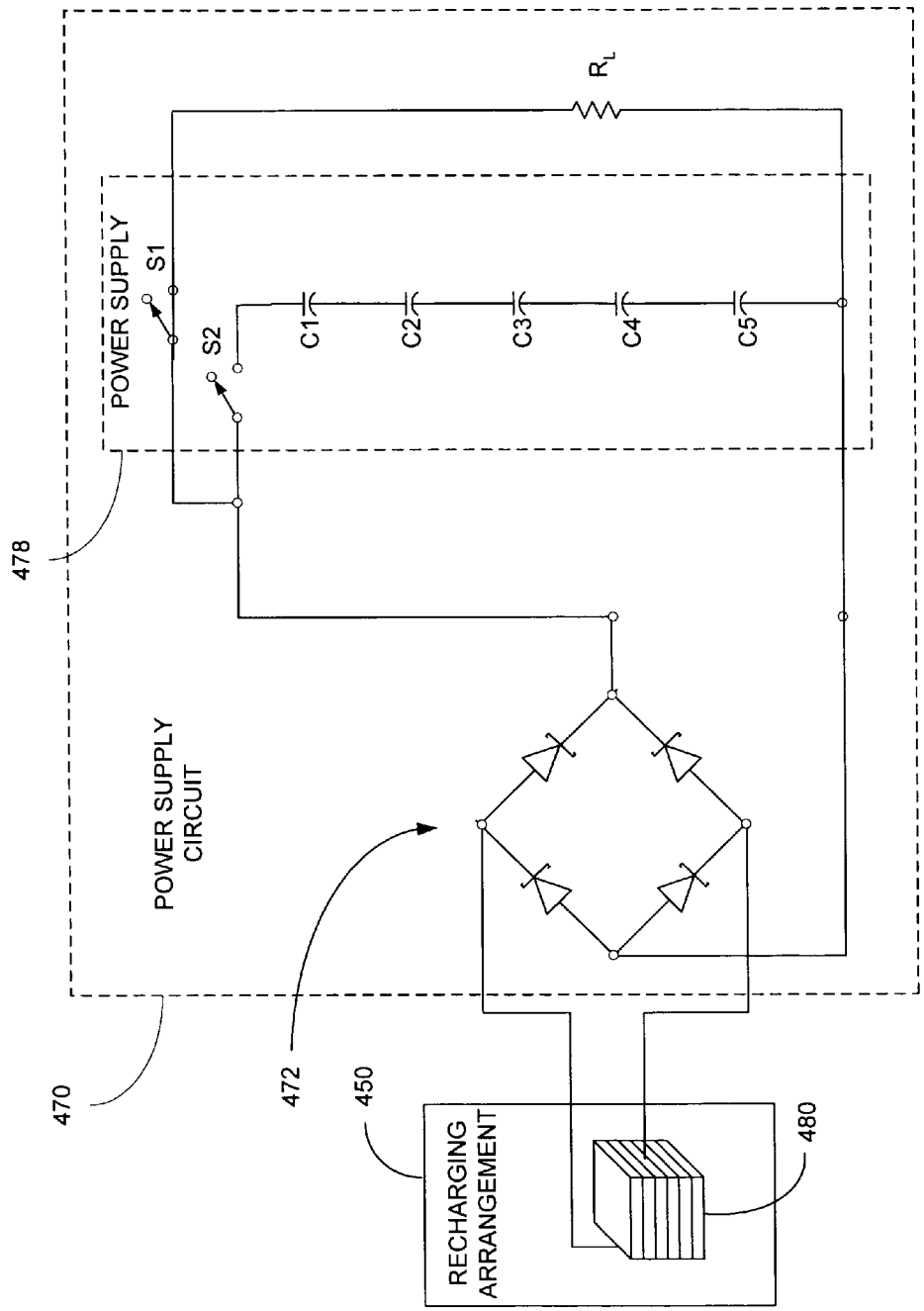
FIG. 10 is a schematic representation of a recharging arrangement and power supply circuit that may be used in a shock and vibration isolation system according to an embodiment of the invention.

FIG. 10 is a schematic representation of the connection of a recharging arrangement 450 to an illustrative power supply circuit 470. The power supply circuit comprises a rectifier bridge portion 472 and a power supply 478. The power supply 478 may be any power storage device such as a battery, or one or more capacitors, capable of delivering a 2.0 amp current to the semi-active damper 422 for approximately 1.5 seconds. In the illustrated embodiment, the power supply 478 comprises a plurality of capacitors C1, C2, C3, C4, C5 that are charged by the output of the recharging arrangement 450. The capacitors C1, C2, C3, C4. C5 may be high capacity chemical capacitors (ultracapacitors), which are compact and are capable of storing large amounts of energy. $R_L$ is the resistance of the load when the capacitors C1, C2, C3, C4, C5 are discharged to power the semi-active damper 422. It will be understood by those of ordinary skill in the art tat additional protective components such as diodes and balance resistors can be used to enhance the operational effectiveness and reliability of the power supply circuit 470, generally, and, more particularly, the capacitors C1, C2, C3, C4, C5.

The power supply circuit 470 may include switches S1, S2, which may be selectively controlled by the damper controller 430. The controller 430 can command the opening of a first switch S1 and closure of a second switch S2 to isolate the damper 422 from the capacitors or other power supply and connect the capacitors to the piezoelectric generator 480. This is the normal state of the power supply circuit 470 when the system 400 is in a normal (i.e., non-shock) operating environment. In this state, the normal vibratory motion of the equipment 20 relative to the base wall 10 causes the piezoelectric generator 480 to produce current, which charges the capacitors C1, C2, C3, C4, C5. When a shock event is perceived, the controller 430 can selectively close the first switch S1 and open the second switch S2 to energize the damper 422. The opening and closing of the first switch S1 can be carried out in accordance with any of the control methodologies previously discussed. Upon termination of the shock event, the controller 430 returns the power supply circuit to its normal charging mode.

The present invention provides significant advantages in performance and in flexibility over prior art isolation devices. The isolation system of the present invention offers an ideal combination of acoustic/vibration isolation and shock isolation. The system is adaptable to varying equipment mass and mass distribution and may be entirely self-contained. It will be understood that the isolation system of the present invention may be used in any orientation and is not limited to isolation in a single degree of freedom. Also, the isolation system of the invention is not limited as to size or mass that can be isolated. Further, it will be understood that multiple isolation systems according to the invention may be used in combination.

Other embodiments and uses of the invention will be apparent to those skilled in the art from consideration of the specification and practice of the invention disclosed herein. The specification and examples should be considered exemplary only. The scope of the invention is limited only by the claims appended hereto.

What is claimed is:

1. A shock and vibration isolation system for mounting equipment to a base wall, the system comprising:
 a load plate configured for attachment of the equipment thereto;
 a base plate configured for attachment to the base wall, the base plate being substantially parallel to the load plate;
 a spring arrangement disposed intermediate the load plate and the base plate, the spring arrangement including at least one pneumatic spring engaging the load plate and the base plate to bias the load plate and the base plate in a separated relationship;
 a magnetorheological damper engaging the load plate and the base plate and being adapted for providing a selectively variable reaction force to the load plate and the base plate responsive to a relative displacement of the load plate with respect to the base plate;
 a damper controller disposed intermediate the load plate and the base plate and operatively connected to the magnetorheological damper for controlling the reaction force applied to the load plate and the base plate the damper controller including a rechargeable power supply; and
 a recharging arrangement in electrical communication with the rechargeable power supply, the recharging arrangement comprising at least one piezoelectric generator adapted for conveying vibratory motion to electrical energy for storage in the rechargeable power supply,
 wherein the damper controller and the rechargeable power supply form a single unit.

2. An isolation system according to claim 1 wherein the damper controller includes an optimum damper force determination module configured for determining from real time data a relative displacement of the load plate and a relative velocity of the load plate with respect to the base plate and for determining an optimum reaction force based on the relative displacement and relative velocity.

3. An isolation system according to claim 2 wherein the controller further includes
 a current driver operatively connected to the magnetorheological damper and the power supply for selectively supplying current to energize the magnetorheological damper;
 a damper force control module in communication with the optimum force determination module and the current driver, the damper force control module being adapted for controlling the supply of current to the magnetorheological damper according to a predetermined control algorithm.

4. An isolation system according to claim 3 wherein the control algorithm is selected from the group consisting of clipped optimal control, velocity feedback control and acceleration bang-bang control.

5. An isolation system according to claim 1 wherein the recharging arrangement includes an electrical coil, at least one spring and a magnet connected to the at least one spring, the magnet being disposed within the electrical coil so that oscillation of the magnet produces a current in the electrical coil.

6. An isolation system according to claim 1 wherein the piezoelectric generator comprises at least one piezoelectric stack generator formed as a laminate of a plurality of prismatic piezoelectric crystals, the piezoelectric stack generator having an upper PSG surface and a lower PSG surface.

7. An isolation system according to claim 6 wherein the piezoelectric stack generator is disposed intermediate the load plate and the equipment so that the upper PSG surface is engaged by the equipment and the lower PSG surface is engaged by the load plate.

8. An isolation system according to claim 6 wherein the piezoelectric stack generator is disposed intermediate the base wall and the base plate so that the upper PSG surface is engaged by the base plate and the lower PSG surface is engaged by the base wall.

9. An isolation system according to claim 1 wherein the damper controller is attached to one of the set consisting of the base plate and the load plate.

10. A self-powered semi-active damping system comprising:
 a semi-active damper disposable intermediate a load and a base wall, the a semi-active damper being adapted for providing a selectively variable reaction force to the load and the base wall responsive to a relative displacement of the load with respect to the base wall;
 a damper controller disposable intermediate the load and the base wall and operatively connected to the semi-active damper for controlling the reaction force applied to the load and the base wall;
 a rechargeable power supply disposable intermediate the load and the base wall and operably connected to the damper controller and the semi-active damper; and a recharging arrangement in electrical communication with the rechargeable power supply, the recharging arrangement comprising a piezoelectric generator and being mountable to one of the base wall and the load and being adapted for converting vibratory motion to electrical energy for storage in the rechargeable power supply, wherein the damper controller and the rechargeable power supply form a single unit.

11. A semi-active damping system according to claim 10 wherein the semi-active damper comprises one of a magnetorheological fluid damper and an electrorheological fluid damper.

12. A semi-active damping system according to claim 10 wherein the rechargeable power supply includes one or a battery and at least one capacitor and is connected to the recharging arrangement through a rectifier bridge circuit.

13. A semi-active damping system according to claim 10 wherein the rechargeable power supply includes a plurality of ultracapacitors connected to the recharging arrangement through a rectifier bridge circuit.

14. A damping system according to claim 10 wherein the damper controller is attached to one of the set consisting of the base wall and the load.

* * * * *